(12) United States Patent
Voigt et al.

(10) Patent No.: US 12,209,893 B2
(45) Date of Patent: Jan. 28, 2025

(54) MAGNETIC-INDUCTIVE FLOW METER

(71) Applicant: Endress+Hauser Flowtec AG, Reinach (CH)

(72) Inventors: Frank Voigt, Weil am Rhein (DE); Steffen Ziegler, Schopfheim (DE); Werner Wohlgemuth, Seewen (CH)

(73) Assignee: Endress+Hauser Flowtec AG, Reinach (CH)

( * ) Notice: Subject to any disclaimer, the term of this patent is extended or adjusted under 35 U.S.C. 154(b) by 310 days.

(21) Appl. No.: 17/757,460

(22) PCT Filed: Nov. 20, 2020

(86) PCT No.: PCT/EP2020/082920
§ 371 (c)(1),
(2) Date: Jun. 16, 2022

(87) PCT Pub. No.: WO2021/121866
PCT Pub. Date: Jun. 24, 2021

(65) Prior Publication Data
US 2023/0009049 A1    Jan. 12, 2023

(30) Foreign Application Priority Data
Dec. 16, 2019 (DE) ............. 10 2019 134 599.5

(51) Int. Cl.
*G01F 1/58* (2006.01)
*G01F 15/14* (2006.01)

(52) U.S. Cl.
CPC ............. *G01F 1/584* (2013.01); *G01F 1/588* (2013.01); *G01F 1/58* (2013.01); *G01F 15/14* (2013.01)

(58) Field of Classification Search
CPC . G01F 1/584; G01F 1/588; G01F 1/58; G01F 15/14
See application file for complete search history.

(56) References Cited

U.S. PATENT DOCUMENTS

| 5,280,727 A | 1/1994 | Hafner et al. |
| 2003/0159522 A1 | 8/2003 | Needham et al. |

(Continued)

FOREIGN PATENT DOCUMENTS

| CN | 204679127 U | 9/2015 |
| DE | 10304568 A1 | 9/2003 |

(Continued)

*Primary Examiner* — Peter J Macchiarolo
*Assistant Examiner* — John M Royston
(74) *Attorney, Agent, or Firm* — Kelly J. Smith; Endress+Hauser (USA) Holding, Inc.

(57) ABSTRACT

A magnetic-inductive flow meter for determining a flow velocity-dependent measurement variable induced in a flowable medium is provided, said flow meter comprising: a measuring tube for conducting the flowable medium in a flow direction, the measuring tube comprising a carrier body, the measuring tube comprising an inlet region in which the carrier body has a first recess located on an inner side of the carrier body, the first recess extending continuously in the flow direction, the measuring tube comprising a support body for stabilizing a liner, the support body being located between the carrier body and the liner, the support body extending into the first recess and thus being interlockingly connected to the carrier body; a device located on the measuring tube for generating a magnetic field that penetrates the measuring tube; and —two measuring electrodes for tapping a measuring voltage induced in the flowable medium.

19 Claims, 2 Drawing Sheets

(56) References Cited

U.S. PATENT DOCUMENTS

2014/0230565 A1* 8/2014 Graf .................. G01F 1/586
   73/861.11
2016/0033314 A1* 2/2016 Huber ................ G01F 1/8413
   73/861.355

FOREIGN PATENT DOCUMENTS

| DE | 10358268 A1 | | 7/2005 | | |
|----|----|----|----|----|----|
| DE | 102013114428 A1 | | 6/2015 | | |
| DE | 102013114429 A1 | * | 6/2015 | ............... | G01F 1/58 |
| JP | 05018800 A | | 1/1993 | | |
| JP | H05-18800 A | * | 1/1993 | ............... | G01F 1/58 |

* cited by examiner

MAGNETIC-INDUCTIVE FLOW METER

CROSS-REFERENCE TO RELATED APPLICATIONS

The present application is related to and claims the priority benefit of DPMA Patent Application No. 10 2019 134 599.5, filed on Dec. 16, 2019, and International Patent Application No. PCT/EP2020/082920, filed Nov. 20, 2020, the entire contents of which are incorporated herein by reference.

TECHNICAL FIELD

The invention relates to a magnetic-inductive flow meter.

BACKGROUND

Magnetic-inductive flowmeters are used for determining the flow rate and the volumetric flow of a flowing medium in a pipeline. A magnetic-inductive flowmeter has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring pipe. A measurement electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate u and, with the aid of a known pipe cross-section, the volumetric flow V can be determined from the induced measurement voltage U.

Magnetic-inductive flow meters are often used in process and automation engineering for fluids, as of an electrical conductivity of approximately 5 µS/cm. Corresponding flow meters are sold by the applicant in a wide variety of embodiments for various fields of application, for example under the name PROMAG.

DE 103 58 268 A1 teaches a magnetic-inductive flow meter with an annular groove incorporated in the inlet and outlet region of the measuring tube, in which annular groove the support body extends to stabilize the liner. Such an annular groove reduces the crack formation in the liner given changes in temperature, and the displacement of the support body in the longitudinal direction despite material shrinkage. However, it is disadvantageous that the support body is not sufficiently secured against twisting about the longitudinal axis of the measuring tube.

SUMMARY

The invention is based on the object of providing a magnetic-inductive flow meter whose support body is better secured against torsion.

The object is achieved by the magnetic-inductive flowmeter.

The magnetic-inductive flow meter according to the invention for determining a flow velocity-dependent measurement variable induced in a flowable medium comprises:

a measuring tube for conducting the flowable medium in a flow direction,
wherein the measuring tube comprises a carrier body,
wherein the measuring tube comprises an inlet region in which the carrier body has a first recess located on an inner side of the carrier body,
wherein the first recess extends continuously in the flow direction,
wherein the measuring tube comprises a support body for stabilizing a liner,
wherein the support body is arranged between the carrier body and the liner,
wherein the support body extends into the first recess and is thus interlockingly connected to the carrier body;
a device arranged on the measuring tube for generating a magnetic field that penetrates the measuring tube; and
two measuring electrodes for tapping a measurement voltage induced in the flowable medium.

An annular groove of the prior art has an anchor surface with a normal vector parallel to the longitudinal direction, which extends substantially in a cross-sectional plane of the carrier body. The support body extending in the annular groove is thus secured against forces in the longitudinal direction, but not against a torque. The first recess running in the longitudinal direction has an anchor surface with a normal vector which is not oriented parallel to the longitudinal direction. When a torque acts on the support body, the torque is transmitted to the anchor surface, and a rotation of the support body about the longitudinal axis of the carrier body is prevented.

The function of the recess extending in the flow direction is that the support body is anchored to the carrier body over the entire length of the first recess. The longitudinal and tangential forces on the support body are distributed in the flow direction among a plurality of force application points, and are thus are reduced at points. If the support body is a sintered body produced by means of a sintering method, crack formation upon cooling of the sintered body is avoided by means of the first recess according to the invention.

The support body is arranged between the first recess and the liner. Thus, only the support body, and not the liner, extends in the first recess.

The measurement variable comprises a flow rate, volumetric flow, and/or mass flow rate, which are respectively determined by means of the detected induced measurement voltage.

Advantageous embodiments of the invention are the subject matter of the dependent claims.

One embodiment provides that the first recess is at least partially helical.

The advantage of a first recess running helically—or in a screw shape—is the resulting distribution of an acting torque on the flanks of the recess along the flow direction.

In addition, according to the invention, not only does the anchor surface of the first recess, onto which an acting torque is directed, increase, but the force distribution on the carrier body is also more uniform.

The first recess can be designed as a notch, edge, and/or internal thread. The internal thread is a profiled notch which runs continuously helically—in a screw shape—in a cylindrical inner wall.

The helical first recess can, for example, be incorporated into the carrier body by means of a thread cutter/drill or by means of a milling machine. The adherence to a thread standard is thereby not necessary to obtain the technical effect.

One embodiment provides that the carrier body at least in part has a wall thickness in the inlet region of less than 7 millimeters, in particular less than 5 millimeters, and preferably less than 3 millimeters.

Given carrier bodies with wall thicknesses of less than 7 millimeters, in particular less than 5 millimeters, and preferably less than 3 millimeters in the thinnest region, the incorporation of, for example, an annular dovetail groove is not possible, or is only possible with a high degree of effort. By contrast, the introduction of a helical first recess can be realized in a simple and advantageous manner.

One embodiment provides that the carrier body comprises an outlet region which has a second recess,
wherein the second recess is at least partially helical.

By introducing a second recess into the outlet region of the carrier body, the support body is better secured against a torsion.

One embodiment provides that the first recess has a first thread direction,
wherein the second recess has a second thread direction,
wherein the first thread direction is the same as the second thread direction.

According to one embodiment, the first recess extends from the inlet region along the measurement segment and transitions into the second recess. The advantage of this is that the support body can be screwed into the carrier body with a complementary formation, i.e., for example, a complementary external thread.

According to a further embodiment, although the two recesses have the same thread direction, the measurement segment remains free of the first and second recesses. An advantage of the embodiment is that the support body is prevented from being unscrewed.

One embodiment provides that the first recess has a first thread direction,
wherein the second recess has a second thread direction,
wherein the first thread direction is not the same as the second thread direction.

According to a further embodiment, the first recess and the second recess have different thread directions. An advantage of the embodiment is that the support body is prevented from being unscrewed.

One embodiment provides that the carrier body has a wall thickness,
wherein the carrier body has a subregion in the inlet region, in which the wall thickness of the carrier body decreases continuously opposite to the flow direction,
wherein the first recess extends into the subregion.

The inner lateral surface of the carrier body in the inlet region thereby assumes the shape of a truncated cone. The inlet region corresponds to the filling region, in which the material forming the support body is filled into the carrier body. The conical shape serves to simplify the filling of the material—for example sintering pellets—forming the support body. The carrier body, in particular the filling region, assumes the function of a funnel. The inner lateral surface of the support body has a cylindrical shape in the inlet region.

One embodiment provides that the support body is open-pored.

The porous material can in principle be plastic, for example an open-cell plastic foam; or a ceramic, for example a foamed ceramic; or a sintered material, with pores.

One embodiment provides that the support body is formed from sintered material, in particular from sintering pellets, which are connected to one another by a sintering method and form pores.

An open porosity or a porosity is realized by the use of fine-grained sintering pellets which are connected to one another by a sintering method and thus form a sintered body. The free spaces forming between the individual beads correspond to the pores.

The material of the support body is advantageously a sinterable metal, in particular sintered bronze. This material does not fuse to form a compact material in the sintering process, but rather still exhibits a sufficient porosity. At the same time, metal is usually mechanically more durable and also thermally more resilient compared to plastic. Foamed ceramics are often hard and durable, but tend to break from vibrations and thermal expansion. Therefore, an application of such measuring tubes would be limited. In contrast, sintered bronze in particular can be processed very well. Due to the metallic ductility, there is additionally no material breakage in the event of vibrations.

It is advantageous if the material of the support body is sintered pellets which are connected to one another by a sintering process and which have pores in the pellet interstices. A further improved resistance with respect to pressure loads can thereby be achieved. The sintering pellets thereby particularly preferably consist of bronze.

After the last sintering step, it is often necessary to remove sintering material protruding at the filling region in order to thus create a clean edge for the liner to be subsequently applied in liquid form. The porosity of the support body allows the adjustment by subsequent pressing of the protruding sintering material into the interior of the carrier body with the sintering core inserted. The support body is thereby compressed. However, it can happen that receptacles provided in the support body are displaced due to the force acting in the longitudinal direction, whereby the introduction of the component to be received—e.g., measuring electrode or pole shoe—is made more difficult or even impossible. However, it has been shown that a displacement of the receptacles can already be avoided by introducing a helical first recess.

One embodiment provides that the first recess and/or the second recess has a radial depth of 0.5 millimeters to 2 millimeters.

For an optimal pore size for binding the liner to the support body, the sintering pellets should have a diameter of more than 0.1 mm. Accordingly, it is advantageous if the first and/or second recess has a radial depth of 0.5 millimeters to 2 millimeters.

One embodiment provides that the first recess extends exclusively in a first recess region,
wherein the second recess extends exclusively in a second recess region,
wherein the first recess region and the second recess region, taken together, can be described by a characteristic length in the longitudinal direction,
wherein the characteristic length corresponds to at least 12%, in particular at least 12% and at most 88%, in particular at most 75%, and preferably at most 65% of a total length of the carrier body.

The first recess region has a first length and the second recess region has a second length. The sum of the first length and the second length forms a characteristic length. It has been found that a characteristic length of at least 12% is necessary in order to inhibit the problem with the displacement of the receptacle in the longitudinal direction or in the direction of rotation.

One embodiment provides that the spiral-shaped first recess and/or the second recess have a pitch angle α,
wherein the pitch angle α is between 0.14° and 4°.

This corresponds to a pitch of the recess of approximately 0.2% to 7%.

One embodiment provides that the support body comprises a support body material,
wherein the first recess is filled by the support body material.

It is particularly advantageous if the support body material extends along and contacts all outer surfaces of the first recess. This means that the recess is substantially completely filled by the support body material.

One embodiment provides that the magnetic-inductive flow meter has a measurement segment in which the carrier body has an opening and the support body has a receptacle, in the form of a recess, for arranging the device for generating the magnetic field on the measuring tube,
wherein the device for generating the magnetic field is arranged in the opening and the receptacle.

One embodiment provides that the receptacle adjoins flush with the opening,
wherein a longitudinal axis of the receptacle runs coaxial to the longitudinal axis of the opening.

The connection surface of the support body, with which the measuring tube can be connected to a process connection, should advantageously be covered partially or completely with the material bead of liner material, in order to thus create a wide sealing surface.

BRIEF DESCRIPTION OF THE DRAWINGS

The invention is explained in greater detail with reference to the following Figures. The following are shown.

DETAILED DESCRIPTION

Figure 1:
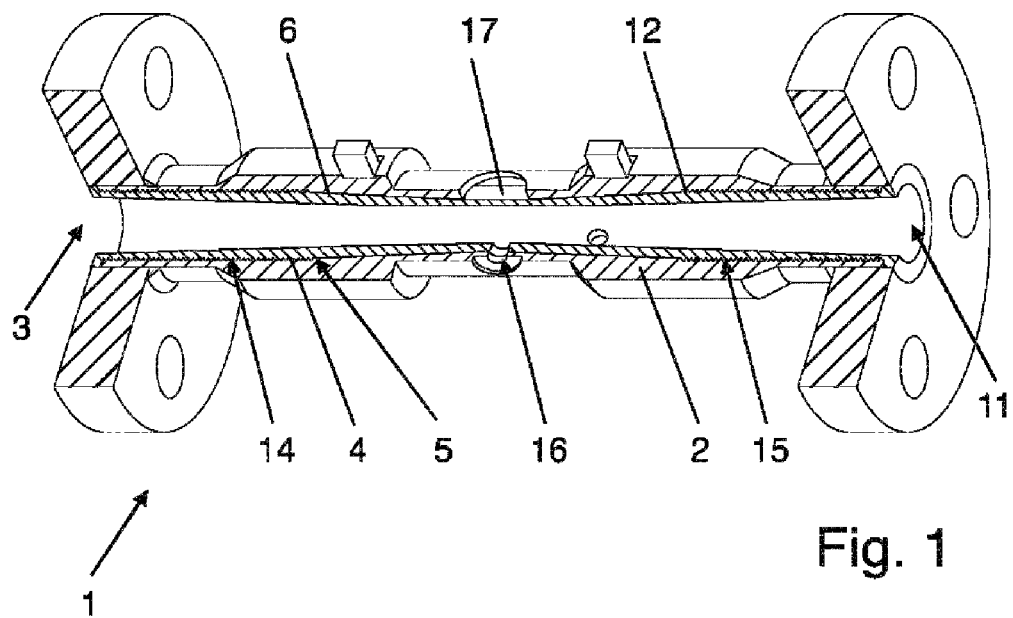
FIG. 1 shows a side view of a partially sectioned embodiment of a magnetic-inductive flow meter according to the present disclosure.

FIG. 1 shows a side view of a partially sectioned embodiment of a magnetic-inductive flow meter according to the invention. The structure and measuring principle of a magnetic-induction flowmeter are known in principle. A medium having an electrical conductivity is conducted through a measuring tube 1. A device for generating a magnetic field is attached in the measurement segment 16 in such a way that the magnetic field lines are oriented substantially perpendicular to a longitudinal direction defined by the measuring tube axis. The device comprises at least two components. A saddle coil or a coil is preferably suitable as the first component. The second component has a magnetically conductive, in particular soft magnetic material, and comprises a coil core arrangement made of at least one coil core around which a coil wire of the coil is wound, at least one pole shoe arrangement with at least one pole shoe, and/or a field return arrangement consisting of at least two field returns. The pole shoe is inserted into an opening 17 in the carrier body 2. Given an applied magnetic field, a flow-dependent potential distribution arises in the measuring tube 1, which distribution is tapped with two measuring electrodes attached oppositely to the inner wall of the measuring tube 1. As a rule, these are arranged diametrically and form an electrode axis, or are intersected by a transverse axis which runs perpendicular to the magnetic field lines and the longitudinal axis of the measuring tube 1. Using the measured measurement voltage U, the flow rate v and, with additional consideration of the tube cross-sectional area, the volumetric flow rate V of the medium can be determined. In order to prevent the measuring voltage applied to the first and second measuring electrodes 3 from being conducted away via the tube, the inner wall is lined with an insulating material, for example a plastic liner (not depicted in FIG. 1 but depicted in FIG. 4). To fasten the liner, a support body 6 is arranged between carrier body 2 and liner. According to the depicted embodiment, the support body 6 has a material which comprises sintering pellets. The support body 6 is produced by means of a sintering method. For this purpose, a sintering core is inserted into the interior of the carrier body 2, and the cavity formed from the sintering core and the inner lateral surface of the carrier body 2 is filled with sintering pellets. The forming of the support body 6 takes place under increased pressure and/or temperature. After the formation of the support body 6, a flowable liner is applied to the support body 6. The flowable liner runs into the pores of the support body 6, whereby the fastening of the liner to the support body 6 and thus also to the carrier body 2 is realized.

The magnetic field built up by the device for generating a magnetic field is generated by a direct current of alternating polarity clocked by means of an operating circuit. This ensures a stable zero point, and makes the measurement insensitive to influences due to electrochemical disturbances. A measuring circuit is configured to read out the induced measurement voltage applied to the first and second measuring electrodes, and an evaluation circuit is designed to determine the flow rate v and/or the volumetric flow V of the medium depending on the measured measuring voltage.

Commercially available magnetic-inductive flowmeters have two further electrodes in addition to the measurement electrodes. On one hand, a fill level monitoring electrode, which is optimally attached at the highest point in the measuring tube 1, serves to detect partial filling of the measuring tube 1 and is configured to forward this information to the user and/or to take into account the fill level in determining the volumetric flow V̇. Furthermore, a reference electrode, which is usually attached diametrically with respect to the fill-level monitoring electrode, or at the lowest point of the measuring tube cross-section, serves to ensure sufficient grounding of the medium. Magnetic-inductive flow meters are known which have an additional temperature sensor which extends into the interior of the measuring tube 1.

A first recess 4 is incorporated on the inner side 5 in the inlet region 3 of the carrier body 2. The first recess 4 is helical. Furthermore, the outlet region 11 of the carrier body 2 has a second recess 12, which is helical. In the inlet region 3, a subregion 13 is present in which the wall thickness of the carrier body 2 decreases continuously opposite to the flow direction. The first recess 4 extends into the subregion 13. For reasons of symmetry, the outlet region also has a subregion in which the wall thickness of the carrier body 2 decreases continuously in the flow direction and into which the second recess 12 extends.

According to the depicted embodiment, the material thickness of the support body 6 varies in the flow direction. In the measuring segment of the measuring tube 1, the inner lateral surface of the support body 6 has a cylindrical basic shape. The cross-sectional area of the support body increases steadily in the direction of the inlet and the outlet. The inner lateral surface is designed as a cone in the segment.

Figure 2:
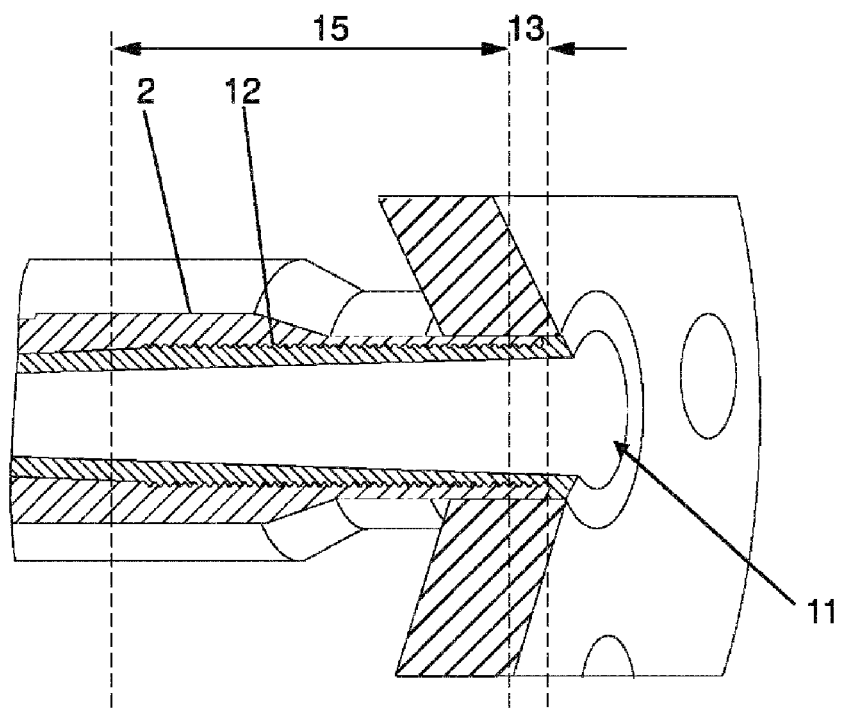
FIG. 2 shows an enlargement of the outlet region of FIG. 1.

FIG. 2 shows an enlargement of the outlet region 11 of the embodiment depicted in FIG. 1. For reasons of symmetry, the configuration of the outlet region 11 corresponds to the configuration of the inlet region. The outlet region 11 or the second recess region 15 has a subregion 13 in which the wall thickness of the carrier tube 2 decreases in the flow direction. This serves to facilitate the filling of the sintering pellets into the cavity formed by the sintering core and carrier body. The inner lateral surface of the support body has a cylindrical basic shape in the subregion 13. As can moreover be seen, the second recess 12 has a radial depth that varies in the direction of flow.

Figure 3:
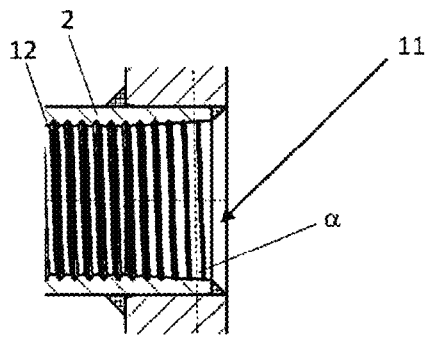
FIG. 3 shows a further enlargement of the outlet region of an embodiment of the magnetic-inductive flow meter according to the present disclosure.

FIG. 3 shows a further enlargement of the outlet region 11 of the embodiment from FIG. 1. The first recess and the second recess 12 respectively have a pitch angle α.

Figure 4:
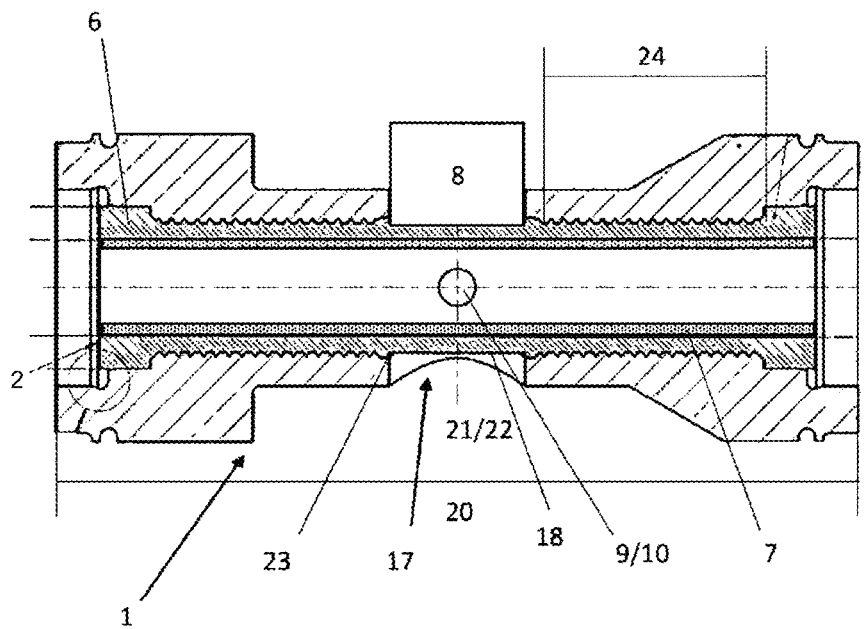
FIG. 4 shows a longitudinal section of another embodiment of the magnetic-inductive flow meter according to the present disclosure.

FIG. 4 shows a longitudinal section of another embodiment of the magnetic-inductive flow meter according to the invention. According to the depicted embodiment, the support body 6 has an inner lateral surface whose basic shape is cylindrical. The electrically insulating liner 7 extends on the inner lateral surface. According to the inventive embodiment, the liner 7 is formed from a plastic which is applied in liquid form to the support body and is subsequently cured. By applying the liner 7 in a liquid state, the liner can extend into the pores of the support body produced by the sintering method and thus also catch.

Two diametrically arranged measuring electrodes 9, 10 are configured to tap a measuring voltage induced in a flowing medium. For this purpose, the measuring electrodes 9, 10 are connected to a measuring circuit (not depicted). The measuring electrodes 9, 10 are arranged in the measuring portion of the measuring tube 1, just like the device for generating a magnetic field 8. This is arranged in an interlocking manner in a receptacle 18 which is formed in the support body 6 and extends through an opening 17 provided in the carrier body 2. The receptacle 18 and opening 17 respectively have a longitudinal axis 21, 22. In the depicted embodiment, the two longitudinal axes 21, 22 are situated atop one another. The receptacle 18 has an edge 23 which adjoins flush with the inner lateral surface of the opening 17.

The carrier body 2 has a total length 20. The carrier body has a first recess region 14 and a second recess region 15. The first recess region 14 has a first length, and the second recess region 15 has a second length 24. Taken together, the first length and the second length 24 form a characteristic length. The characteristic length corresponds to at least 12% of the total length 20.

Unlike in the previously depicted embodiment, the inner lateral surface of the carrier body 2 in the first recess region 14 and in the second recess region 15 is formed cylindrically.

LIST OF REFERENCE SIGNS

1 Measurement tube
2 Carrier body
3 Inlet region
4 First recess
5 Inner side
6 Support body
7 Liner
8 Device for generating a magnetic field
9 Measurement electrode
10 Measurement electrode
11 Outlet region
12 Second recess
13 Subregion
14 First recess region
15 Second recess region
16 Measuring segment
17 Opening
18 Receptacle
20 Total length
21 Longitudinal axis of the receptacle
22 Longitudinal axis of the opening
23 Edge
24 Second length
α Pitch angle

The invention claimed is:

1. A magnetic-inductive flow meter for determining a flow velocity-dependent measurement variable induced in a flowable medium, comprising:
   a measuring tube for conducting a flowable medium in a flow direction,
   wherein the measuring tube comprises a carrier body,
   wherein the measuring tube comprises an inlet region in which the carrier body has a first recess located on an inner side of the carrier body,
   wherein the first recess extends continuously in the flow direction,
   wherein the measuring tube comprises a support body for stabilizing a liner,
   wherein the support body is arranged between the carrier body and the liner, wherein the support body extends into the first recess and thus is interlockingly connected to the carrier body;
   a device arranged on the measuring tube for generating a magnetic field that penetrates the measuring tube; and
   two measuring electrodes for tapping a measuring voltage induced in the flowable medium;
   wherein the first recess and/or a second recess has a radial depth of 0.5 millimeters to 2 millimeters.

2. The magnetic-inductive flow meter according to claim 1,
   wherein the first recess is at least partially helical.

3. The magnetic-inductive flow meter according to claim 1,
   wherein the carrier body in the inlet region at least in part has a wall thickness of less than 7 millimeters.

4. The magnetic-inductive flow meter according to claim 1,
   wherein the carrier body has an outlet region which comprises a second recess,
   wherein the second recess is at least partially spiral-shaped.

5. The magnetic-inductive flow meter according to claim 4,
   wherein the first recess has a first thread direction,
   wherein the second recess has a second thread direction,
   wherein the first thread direction is the same as the second thread direction.

6. The magnetic-inductive flow meter according to claim 4,
   wherein the first recess has a first thread direction,
   wherein the second recess has a second thread direction,
   wherein the first thread direction is not the same as the second thread direction.

7. The magnetic-inductive flow meter according to claim 2,
   wherein the carrier body has a wall thickness, wherein the carrier body in the inlet region has a subregion in which the wall thickness of the carrier body decreases continuously opposite to the flow direction,
wherein the first recess extends into the subregion.

8. The magnetic-inductive flow meter according to claim 1,
wherein the support body is open-pored.

9. The magnetic-inductive flow meter according to claim 1,
wherein the support body is formed from sintered material.

10. The magnetic-inductive flow meter according to claim 4,
wherein the first recess extends exclusively in a first recess region,
wherein the second recess extends exclusively in a second recess region,
wherein the first recess region and the second recess region, taken together, can be described by a characteristic length in the longitudinal direction,
wherein the characteristic length is at least 12% of a total length of the carrier body.

11. The magnetic-inductive flow meter according to claim 2,
wherein the helical-shaped first recess and/or the second recess has a pitch angle α,
wherein the pitch angle α is between 0.14° and 4°.

12. The magnetic-inductive flow meter according to claim 2,
wherein the support body comprises a support body material,
wherein the first recess is filled by the support body material.

13. The magnetic-inductive flow meter according to claim 1,
wherein the magnetic-inductive flow meter has a measuring portion in which the carrier body has an opening, and the support body has a receptacle in the form of a recess, for arranging the device for generating the magnetic field on the measuring tube,
wherein the device for generating the magnetic field is arranged in the opening and the receptacle.

14. The magnetic-inductive flow meter according to claim 1,
wherein the receptacle adjoins flush with the opening,
wherein a longitudinal axis of the receptacle runs coaxially with the longitudinal axis of the opening.

15. A magnetic-inductive flow meter for determining a flow velocity-dependent measurement variable induced in a flowable medium, comprising:
a measuring tube for conducting a flowable medium in a flow direction,
wherein the measuring tube comprises a carrier body,
wherein the measuring tube comprises an inlet region in which the carrier body has a first recess located on an inner side of the carrier body,
wherein the first recess extends continuously in the flow direction,
wherein the measuring tube comprises a support body for stabilizing a liner,
wherein the support body is arranged between the carrier body and the liner,
wherein the support body extends into the first recess and thus is interlockingly connected to the carrier body;
a device arranged on the measuring tube for generating a magnetic field that penetrates the measuring tube; and
two measuring electrodes for tapping a measuring voltage induced in the flowable medium;
wherein the carrier body has an outlet region which comprises a second recess,
wherein the second recess is at least partially spiral-shaped,
wherein the first recess extends exclusively in a first recess region,
wherein the second recess extends exclusively in a second recess region,
wherein the first recess region and the second recess region, taken together, can be described by a characteristic length in the longitudinal direction,
wherein the characteristic length is at least 12% of a total length of the carrier body.

16. The magnetic-inductive flow meter according to claim 15,
wherein the magnetic-inductive flow meter has a measuring portion in which the carrier body has an opening, and the support body has a receptacle in the form of a recess, for arranging the device for generating the magnetic field on the measuring tube,
wherein the device for generating the magnetic field is arranged in the opening and the receptacle.

17. The magnetic-inductive flow meter according to claim 15,
wherein the receptacle adjoins flush with the opening,
wherein a longitudinal axis of the receptacle runs coaxially with the longitudinal axis of the opening.

18. A magnetic-inductive flow meter for determining a flow velocity-dependent measurement variable induced in a flowable medium, comprising:
a measuring tube for conducting a flowable medium in a flow direction,
wherein the measuring tube comprises a carrier body,
wherein the measuring tube comprises an inlet region in which the carrier body has a first recess located on an inner side of the carrier body,
wherein the first recess extends continuously in the flow direction,
wherein the measuring tube comprises a support body for stabilizing a liner,
wherein the support body is arranged between the carrier body and the liner,
wherein the support body extends into the first recess and thus is interlockingly connected to the carrier body;
a device arranged on the measuring tube for generating a magnetic field that penetrates the measuring tube; and
two measuring electrodes for tapping a measuring voltage induced in the flowable medium;
wherein the first recess is at least partially helical,
wherein the spiral-shaped first recess and/or the second recess has a pitch angle α,
wherein the pitch angle α is between 0.14° and 4°.

19. The magnetic-inductive flow meter according to claim 18,
wherein the support body comprises a support body material,
wherein the first recess is filled by the support body material.

* * * * *